Oct. 8, 1946.   O. H. BIGGS ET AL   2,408,903
ULTRA HIGH FREQUENCY GENERATOR
Filed June 12, 1943   2 Sheets-Sheet 1
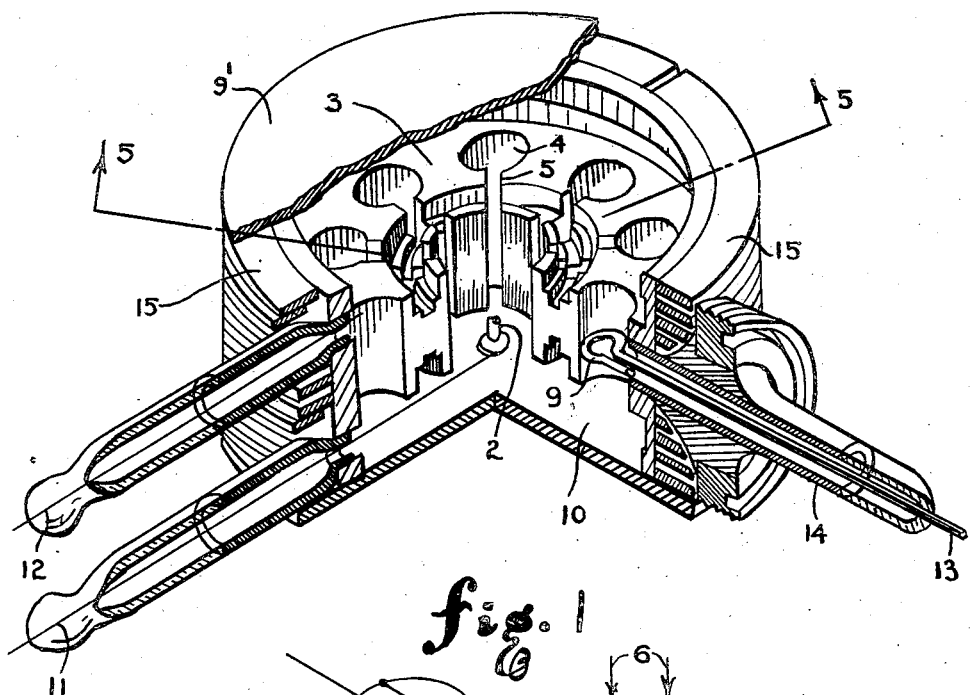
fig. 1
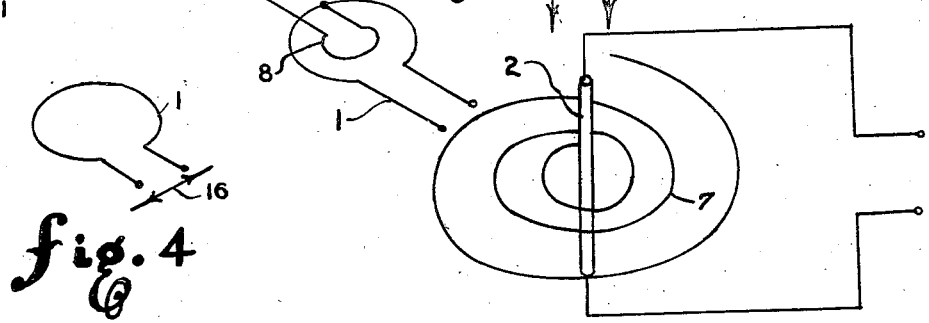
fig. 4
fig. 2
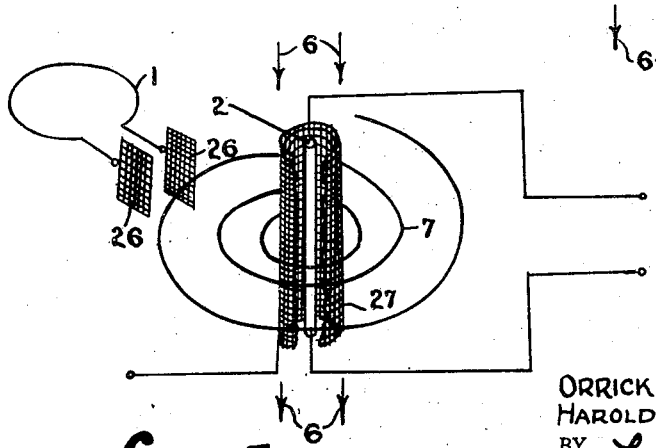
fig. 3
ORRICK H. BIGGS   INVENTORS
HAROLD HEINS
BY Lawrence Brung
ATTORNEY

INVENTORS
ORRICK H. BIGGS
BY HAROLD HEINS
ATTORNEY

Patented Oct. 8, 1946

2,408,903

UNITED STATES PATENT OFFICE 2,408,903

ULTRA HIGH FREQUENCY GENERATOR

Orrick H. Biggs, Beverly, and Harold Heins, Marblehead, Mass., assignors to Sylvania Electric Products Inc., Salem, Mass., a corporation of Massachusetts Application June 12, 1943, Serial No. 490,698

4 Claims. (Cl. 250—27.5)

This invention relates to electrical devices with particular reference to the generation of ultra high frequency oscillations.

An object of this invention is to provide improved means and method in the generation of ultra high frequency oscillations.

Another object is to provide a device for generating high frequency electrical oscillations, with means for adjusting said device to a particular frequency.

Another object is to provide a device for generating high frequency electrical oscillations, with means for producing increased strength in the oscillations.

Another object is to provide a device for generating high frequency electrical oscillations, with means for reducing the power input necessary to produce a particular strength of oscillation.

Other objects, advantages, and features will be apparent from the following specification taken in conjunction with the accompanying drawings in which:

Figure 1 is a perspective in partial section, of a generator unit for the embodiment of this invention;

Figure 2 is a schematic diagram of the basic operation of such a generator;

Figure 3 is a view similar to Figure 2 showing the use of grids in accordance with this invention;

Figure 4 is a schematic illustration of the frequency adjustment of this invention;

Figure 5:
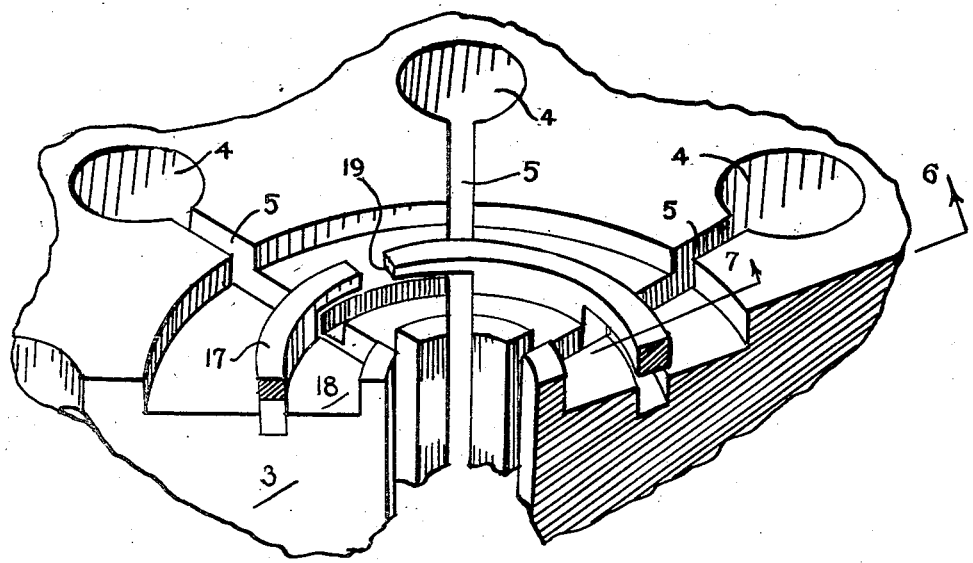
Figure 5 is an enlarged partial view of the device of Figure 1, taken on line 5—5 of Figure 1.
Figure 7:
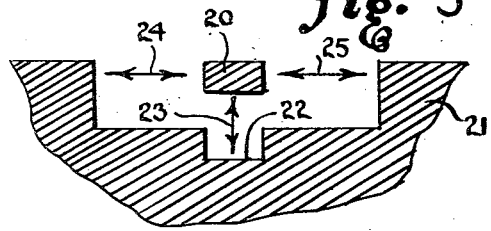
Figure 6:
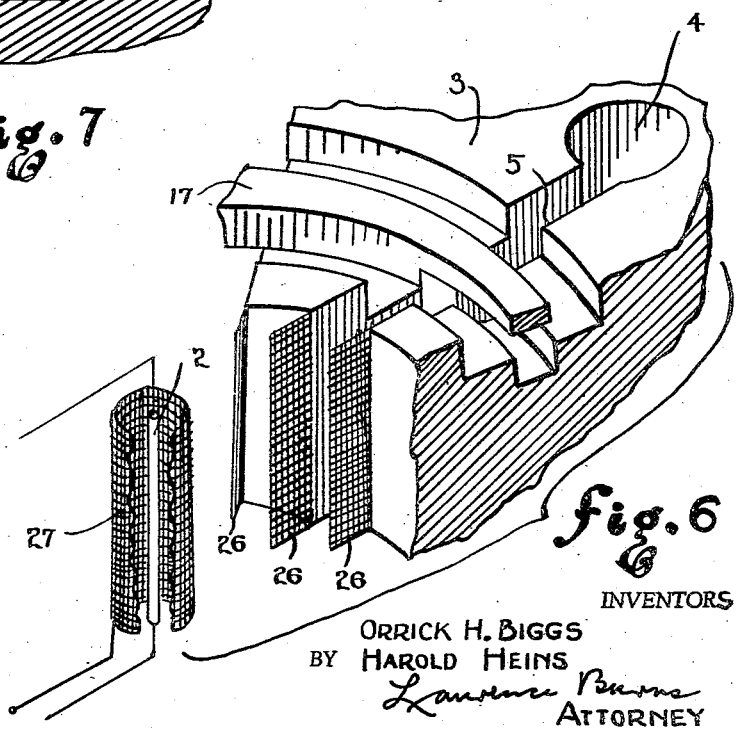

Figure 6 is a view in illustration of the relation of Figures 1 and 3 taken in part on line 6 of Figure 5; and Figure 7 is a view taken in part on line 7 of Figure 5 in further illustration of the frequency adjustment of this invention.

In the generation of ultra high frequency electrical waves, a method is to set up oscillations in a small oscillatory circuit, and to pick up ultra high frequency waves from the field thus set up adjacent the oscillatory circuit.

A device for carrying out such a method may be in the form of a generator unit in which the oscillatory circuit is formed by machining or other suitable metal forming operation. Such a circuit is capable of producing electrical waves at a fixed natural frequency, limited by the form, dimensions, and electrical characteristics of the metal. It has the disadvantage that a particular frequency is difficult to achieve precisely, since such achievement depends on the accuracy of the metal forming processes.

In a generator such as described, a current flow is set up between electrodes, and this flow is passed adjacent the oscillatory circuit to energize it into oscillation.

This arrangement ordinarily operates with the current flowing past the mouth of an opening, the edges of which pick up the energy to set up oscillations in the circuit. This has the disadvantage that much of the energy of the current flow does not affect the circuit.

The power ordinarily necessary to set up the current flow in such a generator is considerable, and in many instances this is a real disadvantage.

This invention obviates the above difficulties in that it provides means for adjusting the wavelength of the output of the generator so that the device may be formed to relative broad tolerances, and thereafter adjusted to the particular wavelength desired; in that it provides a grid arrangement in the oscillatory circuit to utilize more of the current flow; and in that it provides a grid arrangement and bias to aid in setting up the current flow, making it possible to materially reduce the input power necessary to operate the generator.

The unit used to illustrate an embodiment of this invention is shown in Figure 1, with a schematic illustration of its operation shown in Figure 2.

The device is based on the Hertz oscillator principle in which oscillation in an adjacent circuit causes like oscillation to be set up in a circuit of the general form of circuit 1, Figure 2.

In this device, a space current is made to flow between a pair of electrodes, of which the cathode 2 is one, and the body 3 of the unit is the other. Circuits comparable to 1, of Figure 2, are formed in the body 3, Figure 1, as cylindrical openings 4, having slotted openings 5 communicating with a central, cathode containing opening in the body 3.

The current flow is made to pass the outer mouths of the slotted openings 5, and this action sets up oscillations about the openings 4 comparable to those which would be produced in the Hertzian type circuit 1, Figure 2.

The current flow is thus controlled by setting up a magnetic field vertically centrally through the central opening of the body 3, with field lines in substantial parallelism with the cathode 2 and represented generally by arrows 6. The path of current flow thus set up is generally in the form of a spiral as at 7. This spiral 7 shows only the main form of the current flow. Actually it is full of loops and whorls within the general path of flow; when oscillations are thus set up in the loop of circuit 1, or correspondingly, in the body 3 of the generator, about the openings 4, oscillatory fields are set up within the loop 1 and openings 4 and the impulses thereof are picked up by pick-up loops 8 and 9 respectively.

In the unit of Figure 1 the body 3 is enclosed by a top 9' and bottom 10 and in spaced relation with each. Thus the fields set up in the openings 4 are coupled with each other and may be picked off by the single loop 9 in one of the openings 4. This loop is arranged at right angles to the lines of force of these fields for the maximum pick-up effect. The lead wires for the cathode 2 are shown at 11 and 12 and for the pick-up coil 9, one lead is at 13, and the other is the surrounding sleeve 14. Heat dispersing fins 15 are formed about the unit as shown in Figure 1.

The feature of adjustability to a particular wavelength is illustrated in Figures 4, 5 and 7. As previously stated, the generator of Figure 1 will produce oscillations of a particular frequency, as governed by the formed contour of the metal body. This frequency, however, may not be precisely that which is desired, due to the natural tolerance limitations of forming tools and processes. When this happens it becomes necessary to vary the capacitance-inductance relation of the oscillatory circuits to bring about the precise production of the frequency desired.

This adjustment is schematically illustrated in Figure 4, showing the oscillatory circuit 1 and illustrating by arrow 16 the action of varying the spacing between the ends of the circuit 1 to vary the capacitance therebetween and therefore the frequency characteristic of the circuit. This adjustment feature is accomplished in the generator of Figure 1, through the use of a split ring 17, Figures 5, 6, and 7, mounted on the body 3 in encirclement of the cathode 2. It may be seen that the slots 5 provide peninsular portions 18 of the body 3 between the slots, and adjacent peninsular portions effectively represent opposing plates of the capacitance of the oscillatory circuits defined by openings 4 and their associated slots 5.

The split ring 17 is formed in alternate sections of vertically thin and thick portions with the thick portions engaging alternate peninsulas of the body 3, and the thin portions overlying but not contacting the other series of alternate peninsulas. Thus the ring 17 contacts one peninsula, skips the next, contacts the next, and so on, so that for any two adjacent peninsulas, the capacitance effect of the oscillatory circuit of the opening 4 enclosed thereby, is in part represented by the spacing of the thin portion of the ring 17 from the peninsula which it overlies, but does not touch. Thus bending of a thin portion of ring 17 would be comparable to the adjustment indicated by arrow 16 in Figure 4.

With this arrangement, the body 3 of the generator may be formed to relatively wide tolerances and thereafter the unit made to produce a precisely particular frequency by bending the various thin portions of the ring 17. This ring is split at one point, as at 19, to avoid the formation of an undesirable closed circuit therethrough.

Possible adjustments of the thin portions of ring 17 are shown in Figure 7. In this figure the member 20 represents one of the thin portions of the ring 17 and the member 21 one of the peninsulas of the body 3 which the ring overlies but does not touch. The slot 22 is formed in all the peninsulas and is for the reception and mounting of the thick portions of the ring 17.

As in Figure 7, the preferable adjustment is in the directions of the arrow 23, that is, vertically or in substantial parallelism with the cathode 2. Lateral adjustment, as indicated by arrows 24 and 25, may readily be used, with slightly less effect. In practice, a combination of vertical and lateral adjustment is commonly used. The ring 17 need have no particular cross-sectional form. A circular cross section wire, for example, may be used instead of the ring shown.

The features of increasing the strength of the oscillations in the oscillatory circuits of this generator and of setting up the flow of current between the cathode 2 and body 3, are illustrated in Figures 3 and 6 by use of grids 26 and 27 respectively.

The grids 26 are mounted at the ends of the oscillatory circuit 1 in Figure 3 to increase the effect of the current flow, represented by spiral 7, in setting up oscillations in circuit 1 by increasing the interception of the current flow.

The grid 27 is cylindrical in form and positioned about the cathode 2 with a bias to aid the current flow from the cathode and thus reduce the power necessary to set up this current.

The arrangement of these grids is shown in Figure 6, with the grid 27 about the cathode 2 and the grids 26 mounted as extensions of one of the slots 5 toward the cathode 2 and thus into the path of current flow as represented at 7 in Figure 3.

What I claim is:

1. An ultra-high frequency generator comprising: a radially-slotted annular conducting member having a concentric groove near its inner edge; a cylindrical cathode mounted inside said annular member, concentric therewith and spaced therefrom; and a deformable ring in said groove contacting alternate conducting pieces between the slots.

2. The combination of claim 1, and a concentric grid between the cathode and annular member.

3. The combination of claim 1, and grids extending radially inward from the edges of the slotted portions of the annular member.

4. The combination of claim 1, in which the deformable ring is split to avoid the formation of a closed circuit therethrough.

O. H. BIGGS.
HAROLD HEINS.